Jan. 9, 1945. E. NORRMAN 2,366,800
INDICATING DEVICE
Original Filed Dec. 23, 1940
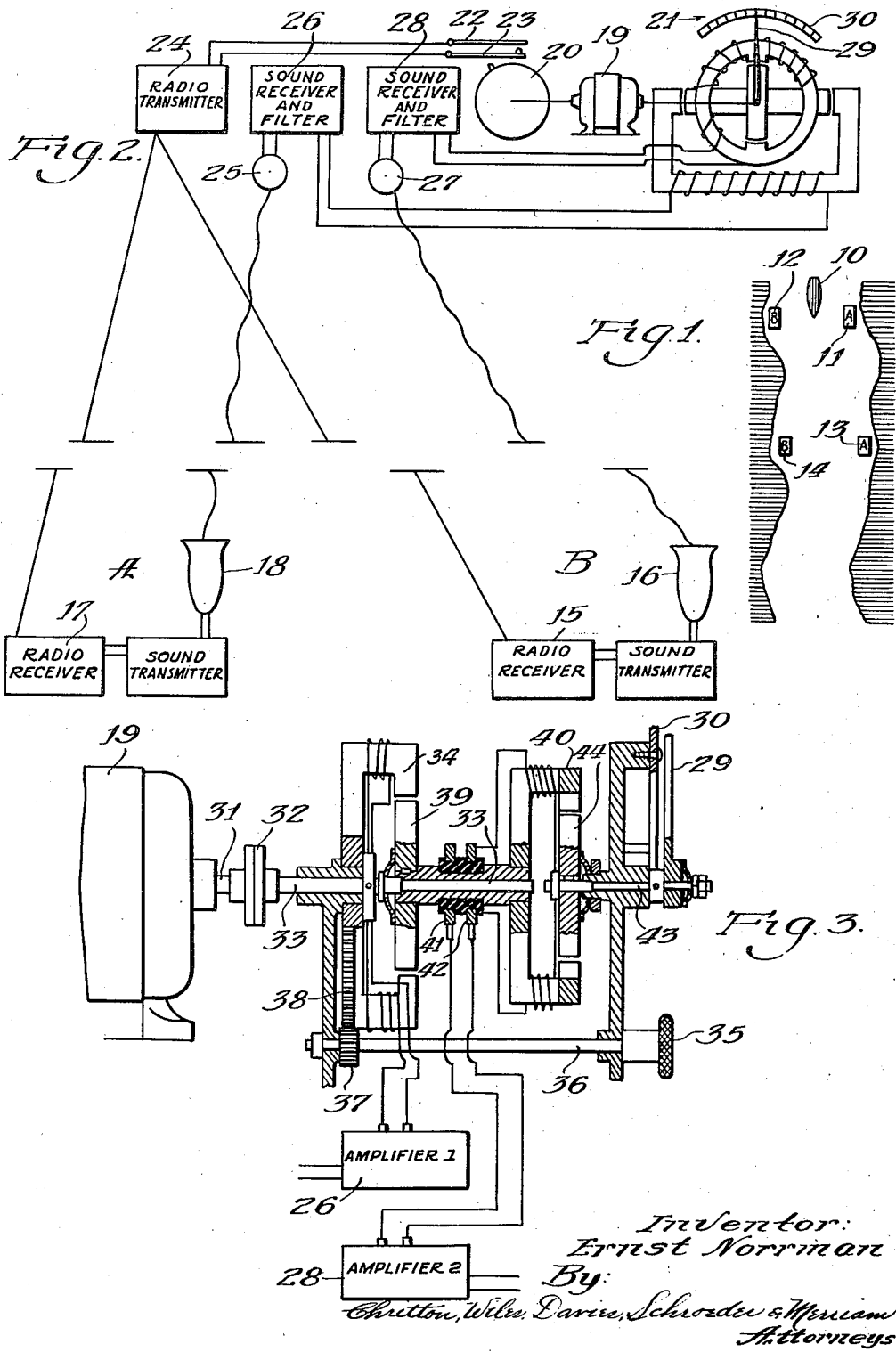

Patented Jan. 9, 1945

2,366,800

UNITED STATES PATENT OFFICE 2,366,800

INDICATING DEVICE

Ernst Norrman, Williams Bay, Wis.

Original application December 23, 1940, Serial No. 371,454, now Patent No. 2,326,880, dated August 17, 1943. Divided and this application July 15, 1943, Serial No. 494,806

6 Claims. (Cl. 177—352)

This invention relates to an indicating device, and more particularly to means for providing a continuous automatic indication comparing two distances measurable by the propagation and reception of waves.

One feature of this invention is that it facilitates operation of a moving body, as a ship or aircraft; another feature of this invention is that it enables easy following of a mid course between successive pairs of fixed points; and still another feature of this invention is that the indication is continuous in the sense that the desired information at any instant may be determined merely by glancing at the indicating portion of the device, there being no necessity for resetting or manual manipulation, for any calculations, or for any waiting until an indication is given. Other features and advantages of this invention will be apparent in the following specification and the drawing, in which:

Figure 1 is a diagrammatic illustration of the way in which my invention is employed; Figure 2 is a schematic showing of apparatus embodying my invention; and Figure 3 is a vertical sectional view of an actual embodiment of the indicating portion of my apparatus.

The present application is a division of my application Serial No. 371,454, filed December 23, 1940, which issued as Patent No. 2,326,880 on August 17, 1943.

Waves, whether they be electro-magnetic (as light or radio waves) or mechanical (as sound waves), travel with a known speed in the medium in which they are propagated. If the time of initiation or propagation of a wave is known, the time interval elapsing before the reception of the wave provides an indication or measurement of the distance of travel. While this principle may be utilized in connection with any form of wave, it is particularly feasible to make use of mechanical waves in an elastic medium such as air or water, since these waves travel at a considerably slower rate than do electro-magnetic waves.

There are many situations where it is desirable to steer a moving body or vehicle in a course which cannot be seen, because of fog, smoke, heavy rain, or the like. One example is bringing a ship into a harbor entrance, or up a river; and another is bringing an aeroplane into a landing field. My present invention operates by initiating sound waves from two fixed points located an equal distance to each side of the desired course, receiving these waves on the moving body, and comparing the time of reception. Comparing the time of reception, of course, compares the distance from two fixed points. As both waves are received simultaneously, the moving body is on the desired course midway between the points.

As is illustrated in Figure 1, my invention may be used to provide a continuous automatic comparison of the distance of a moving body, as the ship 10, from two fixed points, as the marker buoys 11 and 12 on opposite sides of the channel. Further along in the channel are another pair of buoys, here indicated as 13 and 14, equally spaced to each side of the channel.

As is better shown in Figure 2, each buoy may be provided with radio receiving and sound transmitting apparatus, as the receiver 15 and sound transmitter 16 in the buoy B, and the receiver 17 and sound transmitter 18 in the buoy A. These sound transmitters, which may be horns, sirens, or the like, with appropriate driving means, are so arranged as to provide two different readily separable waves in the audible range, or in the supersonic range. One sound transmitter, as that on the buoy A, might emit a sound with the frequency of middle C (256 cycles per second); and the other might transmit sound waves with a frequency two octaves higher (1,024 cycles per second). The radio receiver is of the automatic type, continuously energized, and tuned to a predetermined frequency. It is operatively connected to the sound transmitter (as by an appropriate relay) in such a way that the reception of a signal on a predetermined frequency initiates propagation of sound waves by the associated sound transmitter.

The ship is provided with apparatus shown diagrammatically in the upper portion of Figure 2. This mechanism includes a synchronous motor 19 (or other type of motor revolving at an accurately predetermined rate) rotating a cam 20 and the indicating device identified in general as 21. Upon each rotation of the cam 20, the contacts 22 and 23 are closed and operation of the radio transmitter 24 initiated to send out a radio signal of known frequency, this frequency being made the same as that to which the radio receivers 15 and 17 of the buoys 11 and 12 are tuned. The reception of these radio waves initiates operation of the two sound transmitters 16 and 18, this being simultaneous. The speed of travel of the radio waves is so high that any difference in distance between the ship and the two buoys may be disregarded, the two buoys receiving the signal and initiating sound waves at the same instant, for all practical purposes.

The sound from the sound transmitters is picked up by microphones on the ship and passed through sound receiver and filter arrangements, preferably including an amplifier so arranged as to provide an electrical impulse of very brief duration upon reception of the sound waves. While the sound waves from both sound transmitters are actually received by both microphones and later separated in the filters, they are, for convenience of illustration, shown here as received separately. That is, Figure 2 shows the sound waves from sound transmitter 18 as being received by microphone 25 associated with the sound receiver 1, this being here identified as 26 and being understood to include filter and amplifying means; and the sound waves propagated by the sound transmitter 16 are shown as received by microphone 27 associated with sound receiver 2, here identified as 28. The outputs of the two sound receivers are used to energize two different electro-magnets in the indicating system identified in general as 21, providing a continuous automatic comparison of the distances from the points when the waves were initiated, this indication being by an easily read pointer associated with a scale, as the pointer 29 and scale 30.

The indicating device is better shown in Figure 3, to which reference will now be made in describing the construction and arrangement of this device. The motor 19 is either a slow-speed motor or operates through a reduction gear, so that its output shaft 31 rotates at a relatively slow but reasonably accurate predetermined rate, as one revolution per second. The shaft 31 is coupled by a friction clutch 32 to another shaft 33, this latter being coaxial with the shaft 31. The friction clutch 32 has sufficient power to normally rotate the shaft 33 (and the parts carried by it, to be subsequently described) in synchronism with the shaft 31; but it slips at a low enough torque to permit relative movement between the two shafts when correcting impulses are supplied to an electro-magnet, as will be more fully described.

Concentrically mounted with respect to the shaft 33 is an electro-magnet 34. This electro-magnet is fixed, in the sense that it does not rotate during operation of the device; but manual preliminary adjusting means, comprising the rotatable knob 35, the shaft 36, and the gears 37 and 38, enable adjustment of the position of the electro-magnet 34 to enable proper initiation or zero setting of the indicator.

The shaft 33 has rigidly mounted thereon an armature 39, this armature being so located as to cooperate with the poles of the electro-magnet 34. The shaft 33 also carries (at its right-hand end, speaking with respect to the position of the parts as shown in Figure 3) a rotating electro-magnet 40, connections being made to the windings of this electro-magnet through slip rings 41 and 42.

Coaxial with the shaft 33 is another shaft, here identified as 43. Rigidly mounted on this shaft is an armature 44 adapted to cooperate with the poles of the electro-magnet 40; and the previously mentioned pointer or indicator needle 29, adapted to cooperate with the scale 30.

Referring now more particularly to the system as a whole, rotation of the cam 20 (at the assumed one revolution per second, for example) periodically initiates brief propagation of radio waves by the radio transmitter 24, which in turn causes simultaneous propagation of sound waves by the sound transmitters 16 and 18. For the purposes of explanation, it will be assumed that the ship is closer to buoy A than to buoy B; and that the motor drives the shaft 31 in a counter-clockwise direction (when one is facing the indicator needle and scale). The sound transmitted by the device 18 is therefore received first, creating an electrical signal in the sound receiver 26. As mentioned above, this arrangement includes a filter to separate and reject other undesired sounds, passing only the desired sound; and an amplifier of a type which provides, upon each actuation, only a single very brief electrical impulse. Such an amplifier is illustrated, for example, in my earlier Patent No. 2,058,616. The impulse from the amplifier forming part of sound receiver 1 thus briefly energizes the windings of the electro-magnet 34 upon reception of the waves from the buoy A; and this causes the armature 39 (and thus also the rotating electro-magnet 40) to align itself with the poles of the electro-magnet 34 at such instant, slipping the clutch 13, if necessary to effect such alignment. Shortly thereafter the sound impulse from the buoy B is received and a brief electrical impulse from the sound receiver arrangement 2 energizes the windings of rotating electro-magnet 40 and aligns armature 44 (and thus needle 29) therewith at such instant. The shaft 43 is mounted with a frictional resistance to rotation which is low enough to enable aligning movement of the shaft upon energization of the windings of the electromagnet 40, but providing sufficient resistance to keep the shaft and pointer from over-running the desired position, or moving from other causes between energizations of the windings of the electro-magnet 40.

If it be assumed that the impulse from buoy B was received at the ship one-one hundredth of a second after the impulse from the buoy A, it will be seen that the first impulse (operating through the electro-magnet 34) would serve to align the rotating electro-magnet 40 with the zero position on the scale 30; and that the rotating electro-magnet would then rotate counter-clockwise one-one hundredth of a revolution (3.6 degrees) before it was momentarily energized by the impulse from sound receiver 2 upon reception of waves from the buoy B. The energization of the rotating electromagnet 40, therefore, would cause the needle 29 to take a position 3.6 degrees to the left of the zero calibration of the scale; and the scale would preferably be calibrated in some arbitrary manner, to show that the ship was off course so many units toward the buoy A. The pilot would then turn the ship slightly to the right and, when he had reached a point midway between the two buoys, the indicator hand would stand at zero. If the ship were to close to the buoy B, the indicator hand would correspondingly swing over to the right of the zero graduation on the scale. Meanwhile, the pointer provides a continuous indication which is readjusted each second to correspond to the facts, so that one needs only to glance at the needle to see whether he is on course or off course to the right or left, the indication showing whether he is considerably off course, or only slightly off course. If it is desired to stay in mid-channel, it is only necessary for the pilot to so steer as to keep the indicating needle on zero. On the other hand, if it is desired to stay slightly to the right of the mid-channel to clear ships coming down from the other side of the river, it is only necessary for the pilot to so steer as to keep the indicator needle a few units to the right of the zero graduation.

Even when the ship has passed the two buoys 11 and 12, their signals can still be used; or by the use of a different frequency radio signal, course indication can be derived from the next succeeding pair of buoys, here indicated as 13 and 14.

While I have shown and described certain embodiments of my invention, it is to be understood that it is capable of many modifications. Changes, therefore, in the construction and arrangement may be made without departing from the spirit and scope of the invention, as disclosed in the appended claims.

What I claim as new and desire to secure by Letters Patent is:

1. Apparatus of the character described for providing a continuous automatic comparison of the relative distances from a moving body to two points from which there is simultaneous periodical initiation of propagation of waves in the same medium, including: a member rotatable in approximate synchronization with such periodical propagation; means responsive to reception of one of the waves for exactly synchronizing an instantaneous position of said member with such reception; and means operatively associated with said member and responsive to reception of the other wave to give the desired indication.

2. Apparatus of the character claimed in claim 1, wherein the rotatable member includes an armature and the synchronizing means includes a fixed electromagnet so positioned as to have the armature in its field, the electromagnet being adapted to be energized by the synchronizing means.

3. Apparatus of the character described for providing a continuous automatic comparison of the relative distances from a moving body to two points from which there is simultaneous periodical initiation of propagation of sound waves, including: a member rotatable in approximate synchronization with such periodical propagation; means responsive to reception of one of the waves for exactly synchronizing an instantaneous position of said member with such reception; and means operatively associated with said member and responsive to reception of the other wave to give the desired indication.

4. Apparatus of the character claimed in claim 3, including: means at each of said points responsive to electromagnetic waves and sound transmitting means controlled thereby, and means on said body for periodically initiating propagation of electromagnetic waves for initiating propagation of said sound waves at said points.

5. Apparatus of the character described for providing a comparison of the relative distances from a moving body to two fixed spaced points, including: means at each of said points for propagating sound waves each of different frequency, such means being normally inactive and responsive to reception of electromagnetic waves to place them in active state; means on said body for propagating electromagnetic waves for initiating propagation of sound waves at said points; means on said body for receiving said sound waves; and automatic means controlled by the difference in the time of initial reception of the two sound waves for indicating the relative distance of the body from said two points.

6. Apparatus of the character claimed in claim 5, wherein the two means on said body are operatively synchronized.

ERNST NORRMAN.